UNITED STATES PATENT OFFICE

2,317,663

SYNTHETIC DRYING OIL COMPOSITION AND METHOD OF PRODUCING THE SAME

Clyve C. Allen, San Francisco, and Vernon E. Haury, El Cerrito, Calif., assignors to Shell Development Company, San Francisco, Calif., a corporation of Delaware No Drawing. Application February 18, 1939, Serial No. 257,200

13 Claims. (Cl. 106—252)

This invention relates to new compositions of matter having valuable film forming properties and more particularly to those of the drying oil type. It deals more especially with novel compositions comprising unsaturated ketones having drying oil-like properties, particularly mixtures comprising such ketones together with other materials, especially siccatives, drying oils, resins, etc., and with an improved and more economical method for manufacturing particularly desirable unsaturated ketones suitable for use in such compositions.

An important object of the invention is to provide drying oil mixtures having more desirable properties. A special object is to improve the drying properties of tung oil paints and varnishes and particularly to provide novel tung oil compositions which form non-wrinkling films on drying. Another object of our invention is the manufacture of synthetic drying oils from ketones. Still another object of our invention is the production of ketone condensation products which are suitable for use as bases or ingredients of linoleum, paints, varnishes, lacquers, printing inks, binders for use in plyboard construction, molding core manufacture, and the like, and other purposes. It is also an object of our invention to provide a process whereby ketones may be converted in high yields to higher boiling products having the foregoing valuable properties and uses. Still another object of the invention is the production of higher unsaturated ketones which are new chemical compounds having drying oil-like properties.

We have discovered that unsaturated ketones such as may, for example, be obtained by condensation of lower ketones in the presence of acid or basic condensation catalysts under suitable conditions, exhibit drying properties similar to the natural drying oils, being responsive to siccatives and capable of forming hard, dry films. They are unique in combining film forming properties with a wide range of solubility in different solvents. They may be made to serve at the same time as film forming component and/or binder, solvent and plasticizer and are particularly advantageous supplements to, or substitutes for, the usual agents of these kinds. We have developed a large number of desirable compositions comprising higher unsaturated ketones which take advantage of the remarkable properties of these ketones and are superior to the products previously used for similar purposes.

The ketone condensation products useful in accordance with our invention correspond to the formula $C_nH_{2n-x}O$ where $n$ is an integer not less than 8 and $x$ is an even integer equal to at least 4 but not greater than $n$, and are unsaturated ketones having drying oil-like properties. Preferred ketones are those having at least two conjugated olefinic bonds, more preferably at least one of which is conjugated with respect to a carbonylic double bond. While lower unsaturated ketones which exhibit drying properties, such, for example, as isopropenyl mesityl oxide and the like, can thus be used, their volatility makes them less desirable for some purposes, than homologous ketones of 12, or more preferably 15 or more carbon atoms per molecule, particularly homologues derived by condensation of conjugated diolefinic ketones. However, by first suitably bodying such lower ketones in closed kettles as will be more fully described hereinafter, they may be successfully applied in the preparation of baking enamels or other compositions where high volatility is undesirable.

In the interest of conciseness we will describe our invention in detail with principal reference to the manufacture and use of a particularly valuable subgroup of higher unsaturated ketones corresponding to the formula

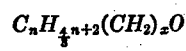

where $n$ is a multiple of 3 equal to at least 9 and $x$ is zero or an integer greater than 3 which is a simple fraction of $n$, such as may advantageously be obtained, for example, by the condensation of three or more molecules of an aliphatic or alicyclic ketone having at least one alpha hydrogen or a mixture of such ketones. This will be understood as not limiting our invention to such preferred ketones, however, as, the novel compositions which we have invented may be prepared from other analogous unsaturated ketones of the formula $C_nH_{2n-x}O$, regardless of their source or method of manufacture. For example, the reaction of a suitable Grignard reagent with a suitable ester, or acyl halide, or nitrile or amine in ether solution followed by hydrolysis may be used, or calcium salts of fatty acids having the desired radicals may be heated to split out calcium carbonate and give suitable higher unsaturated ketones. Dehydrohalogenation of suitable halogenated ketones or still other methods may be used for preparing the desired unsaturated ketonic starting material.

Our improved method for producing ketones of the previously described preferred sub-group, many of which are new chemical compounds, will be described with more particular references to its application to the manufacture of these normally liquid higher unsaturated ketones from acetone, methyl ethyl ketone, methyl propyl ketone and mesityl oxide which have been chosen as examples not only because they are representative ketones but also because they are cheap, readily available starting materials for the process and products of our invention. It will be understood however that not only may other methods and/or reactions be employed for the preparation of these and similar ketones but also other starting materials may be used in the preferred reaction to be described. Thus other ketones which are suitable for use in our novel condensation method include, aliphatic saturated ketones such as diethyl ketone, methyl isopropyl ketone, methyl or ethyl normal- or secondary- or tertiary- or isobutyl ketones, dipropyl or propyl-isopropyl ketones, the amyl and hexyl ketones as methyl normal amyl and methyl normal hexyl ketones and isomers thereof, etc.; aliphatic unsaturated ketones as, for example, methyl allyl ketone, methyl vinyl ketone, methyl isopropenyl ketone, hexen - 1 - one - 5, hepten - 1 - one - 6, 2-methyl-hepten-2-one-6 and higher and isomeric ketones and higher homologues thereof; cyclic ketones such as methyl cyclohexanone, etc., or alicyclic ketones such as methyl cyclohexyl ketone, and the like, or aralkyl ketones of which acetophenone, phenyl-acetone, ethyl phenyl or ethyl benzyl ketone or the like are typical. Any of these ketones may be either saturated or unsaturated compounds with or without suitable substituent elements or groups which may be inert under the reaction conditions or which may undergo simultaneous change without interfering with the production of the desired higher molecular product. Hydroxyl groups and/or halogen atoms are examples of substituents which may be present in the starting ketones. Instead of the monoketones listed, suitable polyketonic compounds may be used. These ketones may be used as the pure chemical individuals or as mixtures thereof or in admixture with other compounds which may or may not be themselves reactive under the conditions of the ketone reaction. Particularly suitable ketone mixtures are those obtainable by dehydrogenation of mixtures of secondary alcohols such as may be prepared by hydration of the corresponding olefines or of the mixtures of primary and secondary alcohols obtainable by hydrogenation of carbon oxides or by other suitable procedures. Another suitable source of starting material for the process of our invention is the condensation of ketones with aldehydes or the like to form higher unsaturated and/or hydroxy ketones. The ketone mixtures may be used in the form of fractions consisting of or predominating in, ketones of the same number of carbon atoms per molecule or mixtures of non-isomeric ketones. Also instead of employing starting materials comprising a ketone or a ketone mixture as the sole source of the higher unsaturated ketone product desired, mixtures of a ketone or ketones with one or more aldehydes capable of reaction with such ketones may be used. Thus saturated aldehydes such as formaldehyde, acetaldehyde, propionaldehyde, isobutyraldehyde and the like or unsaturated aldehydes as acrolein, crotonaldehyde, methacrolein, tiglic aldehyde, etc., or aromatic aldehydes including benzaldehyde, cinnamaldehyde and the like may be present as reactive components of the starting material.

It is known that the ketones such as acetone and the like can be condensed to produce ketols which may be dehydrated to unsaturated ketones corresponding to dimer or trimers of the starting ketone, e. g., mesityl oxide, phorone and isophorone from acetone. Acetone has also been reacted under more drastic conditions at which it is converted to resinous products. Resins have also been obtained by polymerization of alpha, beta unsaturated ketones such as methyl vinyl and methyl isopropenyl ketones. But drying oils have not heretofore been produced from ketones. However, we have found that under properly controlled conditions ketones such as acetone, methyl ethyl ketone, mesityl oxide and the like may be condensed to normally liquid higher unsaturated ketones having drying oil-like properties. In preparing these valuable unsaturated ketone drying oils by condensation of lower ketones two different situations should be differentiated. In the case of saturated ketone starting material the condensation should be carried out so as to produce tetramers or more preferably pentamers or higher unsaturated condensation products. With unsaturated ketone on the other hand it is not always necessary to carry out such extensive reaction as dimers in some cases give useful products although we generally prefer to condense to the trimer form or higher products in this case also. Preferably the condensation reaction involves the splitting off of one molecule of water for each molecule of ketone added to the starting ketone molecule and is most preferably controlled so as to limit undesired polymerization and/or excessive condensation which results in the formation of resins. The products under such preferred conditions are preponderantly normally liquid unsaturated ketones of at least 9, or more preferably 12 to 27, carbon atoms per molecule corresponding to the previously mentioned formula

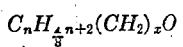
$$C_nH_{\frac{4}{3}n+2}(CH_2)_xO$$

They vary from mobile to viscous liquids which have drying oil-like properties.

For the preparation of such higher unsaturated ketones from acetone, methyl ethyl ketone, mesityl oxide or the like relatively strong condensation agents are preferred. Suitable condensation agents which may be used include, for example, aluminum chloride, boron fluoride, strong acids such as sulfuric and phosphoric acids, strong bases as sodium and potassium hydroxides and the like, acetic anhydride, the zinc alkyls, sodamide, sodium pyrosulfate, sulfamic acid, etc. With strong acids and bases, for example temperatures between about 50° and about 130° C. are suitable, with temperatures of about 60° to 100° C. being preferred. For ease of control and the production of highest quality products we prefer strong aqueous solutions of bases, e. g. 35 to 60% sodium hydroxide solutions. Sulfuric acid of about 80 to 100% concentration is also satisfactory. The time of reaction will depend upon the conditions; milder conditions requiring longer reaction times than more drastic conditions. Too drastic conditions are preferably avoided as they involve difficulties due to side reactions, particularly the formation of products having less desirable properties, inert resins, decomposition and other by-products. Since the reaction of our invention involves the splitting off of water it is desirable to provide for the removal, preferably continuously, of such water of reaction. This may be facilitated, for example, by carrying out the reaction in the presence of benzene or other suitable agent capable of forming an azeotrope with water and using reaction conditions at which such azeotrope distills off from the reaction mixture. In order to facilitate control of the reaction it may advantageously be carried out in steps, lower condensation products formed in the early stage or stages being further reacted, with or without addition of the starting ketone, in later stages. Intermediate products formed may be recycled after separation of the desired product, to the reactor in which they were formed or if a plurality of stages is used to either the same or to another reaction stage.

Where unsaturated ketones which have a tendency to polymerize are used as the starting material or as a component thereof, we prefer to carry out the condensation under relatively mild conditions if feasible and may use less strong condensation agents and/or lower temperature and longer reaction times. Also to retard undesirable polymerization we preferably carry out the condensation in the presence of a suitable polymerization inhibitor. Polymerization inhibitors which may be used include, for example, any sufficiently effective member of the class of substances known as anti-oxidants. Suitable inhibitors are described for example in U. S. Patent 2,104,760. Among the organic inhibitors which may be employed are phenolic compounds, particularly hydroquinone and the like, amines, organic hydroxy amine compounds, water soluble organic acids such as acetic, glycollic, and the like, mercaptans, etc. Examples of inorganic polymerization inhibitors are heavy metals such as copper and suitable alloys thereof, heavy metal oxides and salts, halogens, sulfur, selenium, etc., and suitable compounds of these elements. The amount of polymerization inhibitor required in any particular case will depend upon the inhibitor chosen, the particular polymerization reaction which it is desired to inhibit and the catalyst and conditions used for effecting the desired condensation. The use of polymerization inhibitors particularly those of the anti-oxidant type also may be desirable where saturated ketones are used as starting material.

The process may be carried out continuously, intermittently or batch-wise. Atmospheric, reduced or superatmospheric pressures may be used. The higher unsaturated ketone mixtures produced by controlled condensation of lower ketones in accordance with the process of our invention may be fractionated by distillation, preferably under reduced pressure, with or without steam or other suitable third agents such for example as ethers, esters, alcohols or hydrocarbons which form azeotropic mixtures with one or more of the components of the mixture, into fractions or any desired volatility. They also may be purified of undesired non-ketonic components by selective solvent extraction methods. By reaction with sodium bisulfite or other reagents capable of forming suitable derivatives with certain of the ketones present in the mixture such ketones may be separated from other ketones and/or other components of the mixture.

The following examples illustrate suitable methods for carrying out the reaction and show the results obtainable under a variety of conditions.

Example I 1580 grams of acetone were heated in a closed vessel with 260 grams of 95% sulfuric acid at 60° C. for 28.5 hours after which the reaction mixture was neutralized at 5° C. with sodium hydroxide. The unreacted acetone (950 gms.) and the mesityl oxide formed (81 gms.) were removed by steam distillation and the remaining products then dry distilled, without a column to avoid decomposition, and 25 gms. of trimer cut corresponding to phorone, isophorone, etc., boiling between 132 and 225° C. were removed leaving 371 gms. of product having more than 9 carbon atoms per molecule. Hence approximately 40% of the acetone charged was condensed giving 25% by weight conversion to higher boiling products, 5% of mesityl oxide and 10% water, representing a yield of 62.5% by weight of higher condensation products. The product was a viscous, dark orange liquid containing approximately 70% of unsaturated monoketones and 30% of hydrocarbons having 9 to more than 18 carbon atoms per molecule. By further fractionation this crude product was separated into a fraction boiling between 225 and 255° C. having an average molecular weight of 175 and containing 90% of ketone of the formula $C_{12}H_{18}O$, a fraction boiling between 255° and 305° C. having an average molecular weight of 207 and containing 70.3% of $C_{15}H_{22}O$ ketone, a fraction boiling from 305° to 375° C. having an average molecular weight of 242 and containing 60.2% of ketone corresponding to $C_{18}H_{26}O$ and a bottom product of 550 average molecular weight consisting of higher ketones and hydrocarbons.

In another test 15.45 kilograms of acetone were reacted with 2.74 kilograms of 94% sulfuric acid in a closed iron mixer at 80° C. and 20–25 pounds pressure, with stirring for 6 hours. After adding 2 gallons of saturated brine, 11.249 kilograms of oil phase was separated. Distillation of 2000 grams of this oil gave the following results:

| | Cut | Temperature | Pressure | Grams | Remarks |
|---|---|---|---|---|---|
| | | °C. | Mm. | | |
| | 1 | 40 | 10 | 1,057 | Acetone and 37 gm. mesityl oxide. |
| | 2 | 40–70 | 10–4 | 45 | Mixture of $C_9$ and M. O. |
| | 3 | 70–90 | 4 | 50 | $C_{12}$ ketone. |
| | 4 | 90–125 | 4 | 121 | $C_{15}$ ketones. |
| | 5 | 125–170 | 4 | 157 | $C_{18}$ ketones. |
| Crude drying oils | 6 | 170–225 | 4 | 186 | $C_{21}$ and $C_{24}$ ketones. |
| | 7 | Above 225 | 4 | 326 | $C_{24}$ and $C_{>24}$ ketones. |
| Total recovery | | | | 1,942 | |

From the above results, it is evident that the crude synthetic drying oil obtained is a blend of various chain length ketones with at least 75 percent being higher in chain length than $C_{15}$.

Similar products were obtained using 98% sulfuric acid (13.05% by weight of the acetone) at 80° C. and 30 pounds pressure and 7 hours reaction time at which the yield of products boiling higher than mesityl oxide (average molecular weight 264) was 52.2% based on the acetone reacted. Increasing the proportion of 98% acid to 23.4% increased the yield to 63.5% and also increased the proportion of ketones of more than 24 carbon atoms in the product to 55.3%.

Example II

Heating 2000 cc. of methyl ethyl ketone with 300 cc. of 85% $H_2SO_4$ at 73–80° C. for 1.5 hours under reflux with separation of the water formed gave a yield of unsaturated $C_{12}$ and higher ketones of 14.4% based on the ketone charged or 70.3% based on the total organic reaction products.

Example III

A mixture of 1000 gms. of mesityl oxide and a concentrated sodium hydroxide solution prepared by dissolving 300 gms. of NaOH in 254 gms. of water were refluxed in an iron still for 1 hour while the water and acetone formed were continuously removed. The resulting oil layer was withdrawn, water washed to remove acetone and fractionally distilled. The residual caustic solution was used to similarly react two more 1000 gms. charges of mesityl oxide using reaction times of 1½ hours. In this way 1176 gms. of $C_{12}H_{18}O$ unsaturated ketone, 507 gms. of $C_{18}H_{26}O$ ketone and 180 gms. of higher boiling ketones were recovered. 534 gms. of the $C_{12}H_{18}O$ ketone (boiling range 96° to 105° C. at 4 mm.) were reacted with 588 gms. of mesityl oxide under the same conditions. A yield of $C_{18}H_{26}O$ ketone (boiling range 160° to 170° C. at 4 mm.) of 49.5%, based on the mesityl oxide reacted, was obtained together with 540 gms. of $C_{12}H_{18}O$ ketone in the final run. The total yield of unsaturated ketones of eighteen and more carbon atoms was 69.1% based on the mesityl oxide reacted.

A wide variety of other unsaturated ketones having valuable drying properties may be produced by substituting in whole or in part other ketones for those used in the foregoing examples. For example, ketones of the formula $C_{13}H_{20}O$ may be obtained by condensing three molecules of acetone with one of methyl ethyl ketone, while $C_{14}H_{22}O$ ketones may be obtained by condensing two molecules of acetone with two molecules of methyl ethyl ketone. Self condensation of three molecules of methyl propenyl ketone may be made to give ketones of the formula $C_{15}H_{20}O$ while those of the formula $C_{15}H_{24}O$ may be produced by condensing a molecule of acetone with a methyl ethyl ketone trimer. Tetramers of methyl ethyl ketone have the formula $C_{16}H_{26}O$ while those of the formula $C_{17}H_{28}O$ may be made, for example, by condensing a diethyl ketone dimer with first a molecule of acetone and then a molecule of methyl ethyl ketone. The following table gives suitable methods for preparing a series of eighteen carbon atom ketones which are particularly useful $C_{18}H_{30}O$    Dimer of $C_9$ mono-olefinic ketones
          1 mol mesityl oxide+2 mols methyl isobutyl ketone
          1 mol acetone+3 mols methyl propyl or isopropyl ketone $C_{18}H_{28}O$    2 mols acetone+3 mols methyl ethyl ketone
          1 mol methyl isobutyl ketone+2 mols mesityl oxide $C_{18}H_{26}O$    Acetone hexamer
          Mesityl oxide trimer $C_{18}H_{24}O$    1 mol methyl hexyl ketone+2 mols methyl allyl ketone $C_{18}H_{22}O$    1 mol 2-methyl-hepten-2-one-6+2 mols methyl allyl ketone $C_{18}H_{20}O$    1 mol allyl acetone+3 mols methyl vinyl ketone Unsaturated ketone drying oils of the formula $C_nH_{2n-x}O$ where $n$ is an integer equal to at least 8 and $x$ is an even integer equal to at least 4 but not greater than $n$ have many unusually valuable properties which make them suitable for a wide range of new uses. For example, they are completely soluble in the common lacquer and varnish solvents and thinners. Solutions in the following solvents containing 30% or more by weight of these higher unsaturated ketones produced by condensation of acetone have been made; ethyl and/or butyl alcohols, acetone, methyl heptyl ketone, ethyl and normal, secondary and tertiary butyl acetates, ether, ligroin (30° to 80° C. boiling range), octane, benzene, xylene, di-isobutylene and turpentine. They are insoluble in water but are compatible with the common drying and non-drying oils both in solution and in films. Typical oils in which the higher unsaturated ketones are soluble include, for example, tung, perilla, raw and boiled linseed, blown and cold pressed castor, candlenut, hemp and poppy seed, chaulmoogra, corn, cotton seed, sunflower, sesame, soya bean, walnut and stand oils and the like.

The normally liquid higher unsaturated ketones, which may vary from mobile to highly viscous liquids, are solvents for a wide variety of different resins, gums, cellulose derivatives, asphaltums, tars, waxes and the like. The approximate solubilities of such type materials in a crude drying oil having a boiling range of 40° to 225° C. at 4 mm. and consisting of a mixture of $C_9$–$C_{21}$ ketones and with a purified fraction, principally $C_{18}$ ketones, of boiling range 153° to 190° C. at 4 mm. prepared in accordance with Example III, were tested by successively adding thereto 9, 15, 20 and 24% by weight of typical synthetic resins, natural and synthetic gums, oils and plasticizers, with the following results:

| Type of material added | Material added | Solubility | |
|---|---|---|---|
| Concentrated phenolic resin. | "Bakelite 254%" | >9% | <15% |
| Do | "Bakelite XR 3180" | >9% | <15% |
| Modified phenolic resin | "Beckacite 1112" | >9% | <15% |
| Do | "F-7 Amberol" | >9% | <15% |
| Do | "266 Amberol" | >20% | <24% |
| Do | "Paranol 100" | >9% | <15% |
| Alkyd resin | "Beckasol 1307" | >24% | |
| Do | "Paraplex 58" | >24% | |
| Oil modified alkyd resin | "Rezyl 330-5" | >24% | |
| Drying oil modified resin. | "Rezyl 1103" | >24% | |
| alkyd resin. | | | |
| Castor oil glyceryl sebacate. | "Paraplex RG-2" | >24% | |
| Coumarone | "Heville R-12" | >24% | |
| Coumarone-indene | "Nevindene R-3" | >20% | <24% |
| Do | "Nevidene S-19" | >24% | |
| Do | "Cumar W-½ (Hard)" | >9% | <15% |
| Do | "Cumar P60 (Soft)" | >24% | |
| Natural resin | Rosin | >24% | |
| Do | Damar | >24% | |
| Do | Elemi | >24% | |
| Glycerol modified natural resin. | Ester gum | >24% | |
| Plasticizer | Tricresyl phosphate | >24% | |
| Do | Dibutyl phthalate | >24% | |
| Chlorinated rubber | "Tornesite" | >9% | <15% |
| Cellulose ester | Nitrocellulose | >9% | <15% |

The normally liquid unsaturated ketones of the formula $C_nH_{2n-x}O$ where $n$ and $x$ have the previously described significance, having valuable drying properties, are rapidly responsive to siccatives, similar to natural drying oils. They form adhesive films which slowly become hard and tack-free upon exposure to air and by addition of small amounts, e. g. 0.01 to about 0.5% (as percent of metal based on total solids), of lead, manganese, and/or cobalt naphthenates, linoleates and/or resinates, they dry to clear, glossy, hard, adherent films in a few hours after evaporation of the solvent or solvents used, if any. They can be "cured" or bodied as with true varnish oils by holding them at a moderately elevated temperature. The bodying may be carried out in the same equipment used for bodying natural drying oils, most preferably in a closed kettle or the like. As with natural drying oils suitable resins or gums or siccatives or mixtures thereof may be incorporated during bodying; the resins and gums listed in the foregoing table being particularly suitable.

The foregoing unique properties of the higher unsaturated ketones make them advantageous in a wide variety of uses in the various arts. They are particularly adapted to use in coating, impregnating, adhesive and molding compositions and as binders for fibrous and granular materials. The following examples illustrating such uses of higher unsaturated ketones are to be recognized as only indicative of the extreme adaptability and usefulness of these valuable products.

Especially valuable compositions of our invention are mixtures of higher unsaturated ketones, preferably normally liquid unsaturated ketones boiling above about 200° C., with tung oil. As little as 2% or less of such ketones with tung oil, decidedly improve the hardness and adhesions of the films obtainable on drying while mixtures containing 25 to 80% of unsaturated ketone oil, have greatly reduced wrinkling tendencies as well. In fact, mixtures of 40 to 60% unsaturated ketone oil, particularly equal mixtures of unsaturated ketone and tung oil are substantially non-wrinkling even under the most severe drying conditions. For example, the effect of adding various amounts of unsaturated ketones obtained by condensing mesityl oxide with aqueous NaOH to tung oil before and after bodying was determined in comparison with tung oil bodied alone and with rosin. In all cases the bodying was effected by heating for 3 hours at 400° F. in an open kettle. Naphthenate driers corresponding to 0.176% lead, 0.025% manganese and 0.008% cobalt based on the total solids were added in most cases. The oils were thinned to 65% solids with an aromatic type petroleum thinner and sprayed on 4" x 8" steel panels which were baked at 290° F. for 30 minutes and examined after cooling. Aging tests were also made on the various solutions. The results showed that mixtures of unsaturated ketone drying oils containing driers wrinkle less than the corresponding controls, and that a considerably decreased tendency to wrinkle is evidenced as the concentration of higher unsaturated ketone is increased. Thus it was found that the control was very badly wrinkled while the panel containing 50% of unsaturated higher ketones with the tung oil was smooth, glossy and adhesive. The panels having 5 and 10% unsaturated higher ketone oil with the tung oil although somewhat wrinkled, showed better hardness and adhesion than the control. Increasing the flash time, i. e., the period between coating and baking the coated panel, further decreases the wrinkling of films containing 10% or less of higher unsaturated ketones. The unsaturated ketone drying oils tend to inhibit settling out of driers from the oil. Adding the higher unsaturated ketones to bodied tung oil is just as effective in preventing wrinkling as heat blending it with the oil. This indicates that the action of the ketone is one of solvency. Without the ketone tung oil dries so rapidly on the surface in the presence of driers that film distortion occurs. This is eliminated when a higher boiling unsaturated ketone is present to solutize the oil during baking, resulting in more uniform drying. Crude unsaturated ketone drying oil corresponding to a mixture of $C_9$-$C_{21}$ ketones is inferior to $C_{24}$ ketone, for example, in inhibiting the wrinkling of tung oil films prepared by baking, probably due to volatilization of lower boiling ketones during the heat treatment, but even the crude mixture gives improved results over tung oil alone. The $C_{12}$ ketones are even more effective as wrinkle inhibitors than the higher boiling products when added after bodying the tung oil. Ten percent of $C_{24}$ acetone condensation products inhibits wrinkling better than rosin. The higher unsaturated ketones may be used advantageously to eliminate wrinkling of other film forming materials than tung oil. Thus $C_{24}$ unsaturated ketone octamer of acetone (boiling range 170° to 230° C. at 3-4 mm.) at approximately a concentration of 4% completely inhibits wrinkling of the oil modified alkyd resin "Beckasol 1307" whereas the control wrinkled badly. The ketone condensate was without detrimental effect upon the other properties of the baked films.

Test panels on which mixtures of equal parts of the present ketonic drying oils with toluol and perilla and raw and boiled linseed oils had been applied, showed hard, glossy, adhesive, level films after 17 hours drying at room temperature in the air. With cold pressed or blown castor oil the drying was slower but hard, glossy films were obtained after one day of drying. Even after long aging the films obtained with ketone drying oil to which 0.111% lead or 0.016% manganese or 0.003% cobalt had been added in the form of the naphthenates, were still in excellent condition, being clear, glossy, level, hard and adhesive. Mixtures of higher unsaturated ketones, particularly those of 18 to 24 carbon atoms, corresponding to condensation products of acetone, with linseed oil are especially advantageous tung oil substitutes.

Suitable pigments, fillers, diluents, plasticizers, dyes, and the like may be incorporated with compositions containing the higher unsaturated ketones. They are particularly successful in use as vehicles for aluminum, copper and bronze lacquers. Large amounts of zinc oxide, lithopone, carbon black, iron oxide, white lead, titanium oxide, Prussian blue, and the like may be admixed with such higher unsaturated ketones by the usual grinding methods for the preparation of paints of high covering power. In pigmented compositions the normally liquid unsaturated ketones of the formula $C_nH_{2n-x}O$ where $n$ is at least 10 and $x$ at least 6 have the advantage of retarding the flocculation of the pigments or the like dispersed therein. They are compatible with nitrocellulose and the like and may be used as valuable supplements thereto in the manufacture of clear or pigmented lacquers or in the production of nitrocellulose molding compositions, films, or the like.

Molding composition adapted for use where surfaces are molded on to rigid materials such as plywood, plasterboard, etc., may be prepared by mixing higher unsaturated ketones in a heated Werner and Pfleiderer mixer or the like with wood flour, ethyl cellulose, lamp black, stearates, and the like.

As illustrative of the further uses to which the compositions of our invention may be applied, mention should be made of the printing ink which has been prepared therefrom and of their use as core oils in the preparation of molding cores. For the latter purpose the oil must meet stringent requirements. The cores must be sufficiently strong after being molded and baked to hold together and acute edges must remain sharp and undamaged in removal from the mold. The core oil must not creep or run to the bottom portion of the core during baking and leave the upper part of the core without sufficient binder. The following tests show that drying oils produced by condensation of ketones meet these requirements. Cores were prepared by intimate mixing of 120 parts of Monterey fine sand, 4 parts of cornstarch, 1.5 parts of water and 1.5 parts of oil. The mixture was carefully tamped into a test cylinder mold 1¾ inches in diameter by 1¾ inches in length and baked at 450–500° F. until vapor evolution ceased. "Linoil" a widely used prepared core oil, was used as a control in comparison with crude synthetic dry oil from acetone condensation topped to 400° F. with and without siccatives added in the form of soluble naphthenates in quantity to give the oil 0.111% lead, 0.016% manganese and 0.005% cobalt.

either before or after vulcanization. They make particularly effective protective coatings and may be applied to metals or alloys for example, steel, to prevent corrosion or to wood or other vegetable products to prevent decay, being useful, for example, for sealing wounds of trees or the like, particularly when mixed with wax and tallow. They may be employed to protect crystals, e. g., of copper sulfate and the like, against moisture. The ketone drying oils are permanent plasticizers for nitrocellulose and form therewith films of improved flexibility, adhesion and aging characteristics. They have the additional advantage as plasticizers for film forming compounds, particularly the compatible film forming cellulose compounds, of contributing valuable solids and added strength to the film.

While uses of higher unsaturated ketones which depend in large part upon the unique and unexpected drying properties of these compounds have been emphasized in the foregoing description of our invention because of the great economic importance of this feature of the invention, it will be understood that these ketones have many other valuable and industrially applicable

| | Weight | | Loss of weight in baking | Baking time | Temperature at start of vapor evolution | Character of core | Compression strength crushing load |
|---|---|---|---|---|---|---|---|
| | Before baking | After baking | | | | | |
| | Gms. | Gms. | Gms. | Hr. | °F. | | Lbs./sq. in. |
| Linoil control | 103 | 100.5 | 2.4 | 1.25 | 390 | Firm | 46 |
| Crude acetone drying oil | 104 | 101.5 | 2.4 | 1 | 350 | Crumbly | 46 |
| Crude acetone drying oil with siccatives added | 103 | 99.5 | 3.4 | 1 | 350 | Firm | 96 |

The new synthetic ketone drying oils are also effective weather-proofing agents and are capable of preventing checking and peeling of plywood when exposed to moisture and sunlight. Test pieces of plywood were immersed in boiled and raw linseed oil and crude and distilled acetone drying oil, all with naphthenate driers equivalent to 0.111% lead, 0.016% manganese and 0.005% cobalt added, and in a 20% solution of cumar resin in toluene. After removing the excess oil from the test strips they were allowed to dry overnight then immersed along with an untreated control in water for four hours after which they were exposed on the roof. After eight hours in the sunlight the control and cumar resin treated strips showed a number of small cracks in the surface while the strips treated with acetone drying oil were unchanged showing the effectiveness of higher unsaturated ketones as checking retarders.

Other uses to which the higher unsaturated ketones are adapted include, for example, the impregnation of fibers, textiles and the like. They may be used in water-proofing leather and preferably without addition of driers for making adhesive plasters for medical purposes. With asbestos, wire cloth or the like they are useful in the manufacture of brake linings, and may be applied in preparing insulation for electrical wires and cables. The unsaturated ketones of more than 24 carbon atoms per molecule are adapted, particularly when suitably loaded with fillers such as lithopone, mineral wool, etc., for use in sealing compositions for use in caulking boat decks and the like and for joining materials such as glass, paper, Cellophane, wood or metal as in the manufacture of safety glass or for repairing broken articles, etc. They may be used in the compounding of rubber articles or in coating compositions for such articles which may be applied properties. They may, for example, serve as intermediates in the synthesis of other desirable organic compounds. For example, they form derivatives by reaction with maleic anhydride and can be halogenated by addition of halogen or halogen acid. They can be hydrogenated to form high boiling saturated alcohols and/or less unsaturated and/or saturated ketones as well as hydrocarbons. Thus, for example, by liquid phase hydrogenation in a stirred autoclave using an active nickel catalyst at about 125–175° C. quantitative yields of an alcohol of the formula $C_{18}H_{37}OH$ have been obtained from $C_{18}$ ketones produced in accordance with Example III while by lowering the temperature to about 100°–120° C. the corresponding saturated ketone $C_{18}H_{36}O$ was produced. The normally liquid higher unsaturated ketones may be converted to valuable resins. Thus, for example, 1547 grams of crude acetone condensation product representing trimeric and higher condensates were held at above 100° C. for a short time and the product vacuum distilled. 675 grams of a solid resin-like residue was obtained at 200° C. under 3.5 mm. This material was found to have a melting point by the capillary tube method of 70° C. (uncorrected) and to be soluble to the extent of 20% or more in paraffin hydrocarbons, toluol, n-butyl alcohol, ethyl and normal and secondary butyl acetates, anhydrous ethyl alcohol and methyl ethyl ketone. Dissolved in ethyl, normal and secondary butyl acetates it was compatible with an equal weight of nitrocellulose. By distillation fractions corresponding to acetone nonamers ($C_{27}H_{38}O$ boiling range 432–478° F.) and acetone decamers ($C_{30}H_{42}O$ boiling range 500–572° F.) were separated. These ketone resins or suitable fractions thereof may be advantageously used with the normally liquid unsaturated ketones having drying properties or compositions comprising such ketones and/or other drying oils in the preparation of superior varnishes, paints, and the like. They are also useful as binders in the manufacture of composition boards, etc. The color and particularly the color stability of these ketone resins may be markedly improved by hydrogenation, preferably under conditions designed to minimize cracking. After hydrogenation the product may be advantageously distilled under reduced pressure to increase its softening point.

It will therefore be evident that while we have described in detail suitable means of executing our invention, the invention is not limited to such illustrative examples, nor by any theory advanced in explanation of the improved results attained, but only by the terms of the appended claims.

We claim as our invention:

1. A drying oil composition comprising an unsaturated ketone condensation product of acetone having at least 12 carbon atoms per molecule in which is dissolved tung oil in the proportion of about 5 to about 80 parts by weight of acetone condensation product to about 95 to about 20 parts of tung oil.

2. A mixture comprising tung oil dissolved in a normally liquid unsaturated ketone condensation product of acetone corresponding to the empirical formula $$C_n H_{\frac{4}{3}n+2} O$$

where $n$ is a multiple of 3 equal to at least 12, the acetone condensation product being at least 2% of the total weight of acetone condensation product and tung oil.

3. A mixture comprising tung oil dissolved in an unsaturated ketone of the formula $C_n H_{2n-x} O$, where $n$ is an integer equal to at least 8 and $x$ is an even integer equal to at least 4 but not greater than $n$.

4. A mixture comprising a natural drying oil dissolved in an unsaturated ketone condensation product of acetone having at least 12 carbon atoms per molecule.

5. A mixture comprising a natural drying oil dissolved in an unsaturated ketone of at least 9 carbon atoms per molecule having drying properties and corresponding to the condensation product of an aliphatic ketone.

6. A mixture comprising a natural drying oil dissolved in an unsaturated ketone of the formula $C_n H_{2n-x} O$, where $n$ is an integer equal to at least 8 and $x$ is an even integer equal to at least 4 but not greater than $n$.

7. A mixture comprising an ester type oil dissolved in an unsaturated ketone having drying properties and at least two conjugated olefinic bonds and at least eight carbon atoms per molecule.

8. A drying oil composition comprising a normally liquid unsaturated ketone of the formula $C_n H_{2n-x} O$, where $n$ is an integer equal to at least 8 and $x$ is an even integer equal to at least 4 but not greater than $n$ in which ketone is dissolved a naphthenate drier.

9. A drying oil composition comprising an unsaturated ketone of the formula $C_n H_{2n-x} O$, where $n$ is an integer equal to at least 8 and $x$ is an even integer equal to at least 4 but not greater than $n$ in which ketone is dissolved a siccative.

10. A mixture comprising an unsaturated ketone of the formula $C_n H_{2n-x} O$, where $n$ is an integer equal to at least 8 and $x$ is an even integer equal to at least 4 but not greater than $n$ in which ketone is dissolved a resin.

11. A mixture comprising a normally liquid unsaturated ketone of the formula $C_n H_{2n-x} O$, where $n$ is an integer equal to at least 10 and $x$ is an even integer equal to at least 6 but not greater than $n$ in which ketone is dissolved an alkyd resin.

12. A mixture comprising tung oil dissolved in an unsaturated ketone of the formula $$C_n H_{\frac{4}{3}n+2}(CH_3)_x O$$

where $x$ is an integer greater than 3 and $n$ is a multiple of $x$ and also of 3 and equal to at least 12.

13. A mixture comprising a water-insoluble film-forming substance dissolved in an unsaturated ketone of the formula $C_n H_{2n-x} O$ where $n$ is an integer equal to at least 8 and $x$ is an even integer equal to at least 4 but not greater than $n$, said mixture being adapted to form a hard and tack-free film upon exposure to air.

CLYVE C. ALLEN.
VERNON E. HAURY.